Dec. 5, 1933.  A. RENNER ET AL  1,938,402
CAM SHAFT OR HOLDER
Filed Nov. 30, 1932
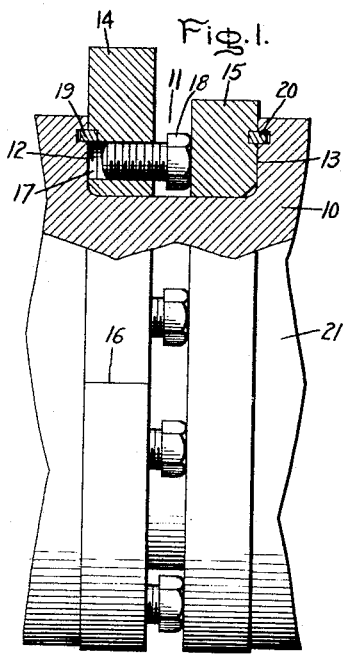
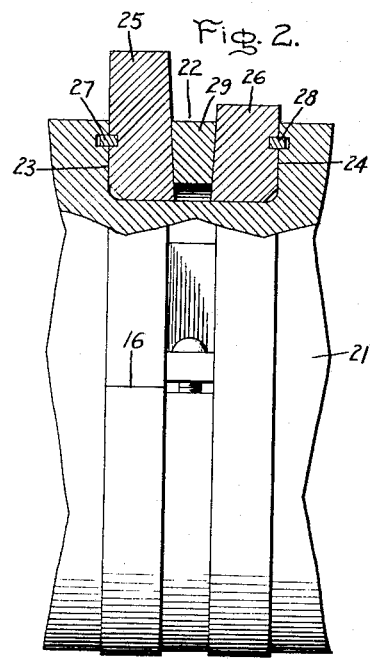
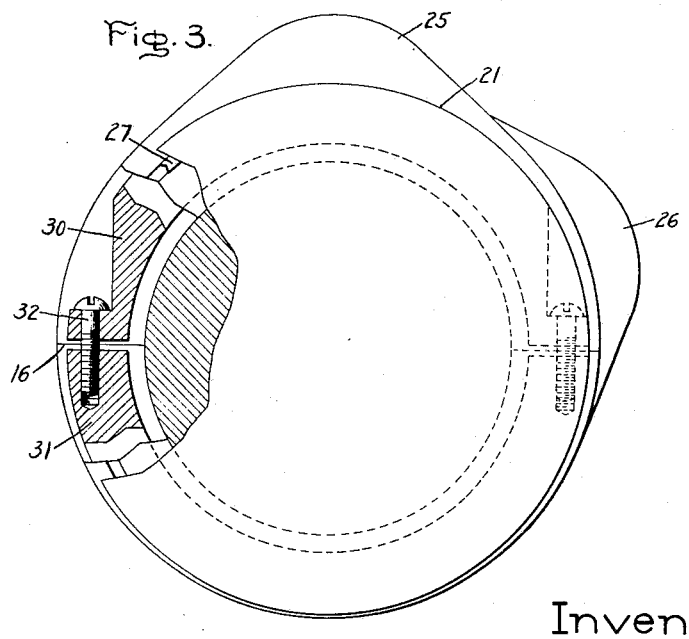
Inventors:
Alfred Renner,
Ernst Daiber,
by Chas. E. Mullen
Their Attorney.

Patented Dec. 5, 1933

1,938,402

UNITED STATES PATENT OFFICE 1,938,402

CAM SHAFT OR HOLDER

Alfred Renner, Berlin-Tegel, and Ernst Daiber, Berlin-Lichterfelde-West, Germany, assignors to General Electric Company, a corporation of New York Application November 30, 1932, Serial No. 645,032, and in Germany February 2, 1931

3 Claims. (Cl. 287—52)

The present invention relates to cam shafts or holders having one or a plurality of cams fastened thereto, such as are used in combustion engines for operating the different valves and pumps of the engines.

The object of our invention is to provide a simple and reliable cam shaft construction in which the cam or cams are rigidly secured to the cam shaft and can be easily adjusted. According to our invention we provide means on the shaft which define shoulders and provide between adjacent shoulders one or more cams. The cams are pressed against the shoulders by means of a suitable clamping device. The shoulders may be defined by the shaft itself, for instance, by turning grooves into the shaft. In this case it is necessary to split the cams and to provide means for centering them to the shaft.

For a better understanding of what we consider to be novel and our invention, attention is directed to the following description and the claims appended thereto in connection with the drawing in which Fig. 1 illustrates partly in section a portion of a cam shaft embodying our invention; Fig. 2 shows a modification of our invention; and Fig. 3 is a front view of Fig. 2 partly broken away.

Referring to Fig. 1, a cam shaft 10 has a circumferential groove or recess 11 defining shoulders 12 and 13. Two cams 14 and 15 are located in the recess and engage with their outer sides or faces the shoulders 12 and 13 respectively. The cams are split into two halves, as indicated at 16. The splitting is necessary in view of the fact that in the present instance the shoulders are initially formed on the shaft itself. One of the cams has a plurality of screw-threaded holes 17 for receiving screws or bolts 18. The centering of the cams on the shaft is accomplished by means of center rings 19 and 20 located partly in grooves of the shoulders and partly in grooves of the cams. A tight pressure fit between the cams and the shoulders is obtained by unscrewing the screws or bolts 11, as can be clearly seen from the drawing. For adjusting the cams we loosen the screws or bolts which permits turning of either or both of the cams in any direction and thereafter unscrew the bolts to force the cams against the corresponding shoulders of the shaft and to hold them in the desired position.

In Figs. 2 and 3, where we have shown as a modification according to our invention, a shaft 21 is provided with a recess 22 for defining shoulders 23 and 24 bearing against the outer surfaces of cams 25 and 26 respectively. The outer surfaces of the cams have grooves registering with corresponding grooves in the shoulders 23 and 24 respectively. Rings 27 and 28 located in said grooves maintain the cams in a centered position with respect to the shaft. The construction so far described is the same as that of Fig. 1. The pressure fit between the cams and the shoulders, however, is accomplished in the arrangement of Figs. 2 and 3 by the provision of a clamping device 29 between the inner surfaces of the cams. The clamping device 29 has one or both of its outer surfaces somewhat inclined towards the shaft and engages similarly inclined surfaces of the cams. The device is ring-shaped with a wedge-like cross section and comprises two halves 30 and 31 (Fig. 3) held together by means of screws 32. Tightening of the screws 32 causes the clamping ring to be drawn towards the shaft and, owing to the wedge-like shape of the ring, causes the cams 25 and 26 to be pressed against the corresponding shoulders of the shaft. For adjusting the cams we loosen the screws 32 and turn the cams in the desired direction and thereafter again tighten the screws.

One advantage of our cam shaft construction is that it permits an easy mounting and demounting, as well as an easy adjustment of the cams. The cams can be arranged close to each other which is desirable, particularly for reversible combustion engines where a plurality of pairs of cams have to be provided on the shaft in which one of each pair is engaged during forward running and the other during backward running of the engine. A slight movement only is necessary to move such a cam shaft from forward running position to backward running position.

Another advantage of the compact arrangement of the cam shaft becomes apparent when a plurality of cams for operating the plungers of fuel pumps have to be provided on the cam shaft as in this case a similar compact construction can be provided for the pumps.

What we claim as new and desire to secure by Letters Patent of the United States, is,—

1. The combination with a cam shaft having portions defining shoulders, of a cam between adjacent shoulders, the cam having a groove registering with a groove in one of the shoulders, means located in both grooves for centering the cam on the shaft, and means for forcing the cam against the last mentioned shoulder and holding it in position.

2. The combination with a cam shaft having a recess defining shoulders, two cams in the recess, each cam having one side engaging one of the shoulders, and clamping means between the cams for forcing them against the shoulders, said clamping means comprising a plurality of screws fastened in holes in a side of one of said cams and having heads bearing against one side of the other cam.

3. The combination with a cam shaft having a recess defining shoulders, two cams in the recess, each cam comprising two halves having outer sides engaging one of the shoulders, means for centering each cam on the shaft, and screws having ends engaging screw-threaded holes in one cam and other ends bearing against the inner side of the other cam.

ALFRED RENNER.
ERNST DAIBER.